Nov. 16, 1926.
H. C. GROVER
HANDLE FOR CULINARY UTENSILS
Filed Feb. 12, 1923
1,606,833
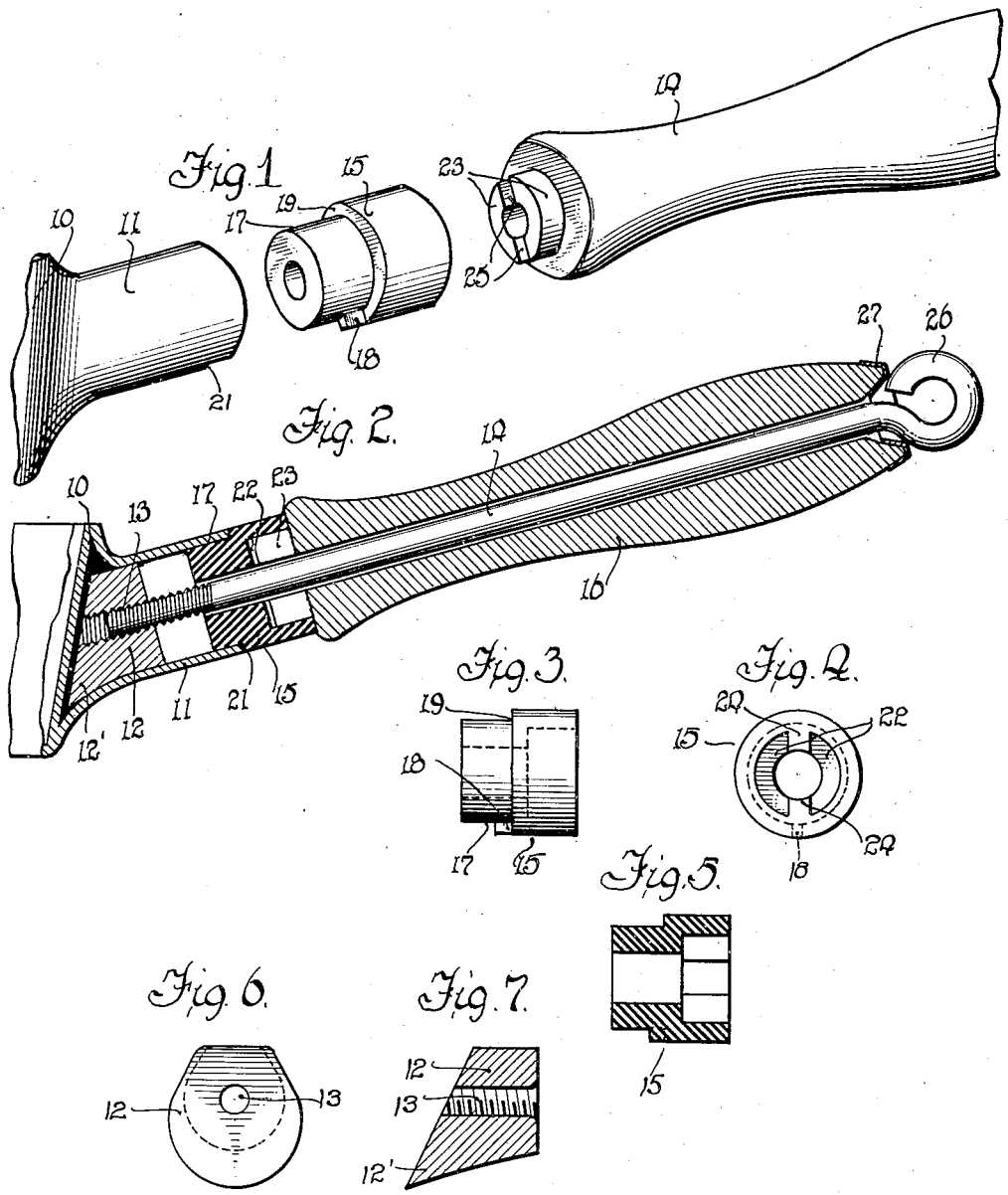
Inventor
Henry C. Grover
By Mason, Fenwick & Lawrence
Att'ys Patented Nov. 16, 1926.

1,606,833

UNITED STATES PATENT OFFICE.

HENRY C. GROVER, OF TWO RIVERS, WISCONSIN, ASSIGNOR TO ALUMINUM GOODS MANUFACTURING CO., OF NEWARK, NEW JERSEY, A CORPORATION OF NEW JERSEY.

HANDLE FOR CULINARY UTENSILS.

Application filed February 12, 1923. Serial No. 618,438.

The present invention relates to handles for culinary utensils, such as frying pans, griddles, etc.

In attaching wooden handles to the sockets of cooking utensils, it is difficult to secure a firm connection.

Primarily the handle should be fastened securely and rigidly to prevent any play or turning of the handle with respect to the utensil. It is easy to key the handle to the socket of the utensil, but the heat of the utensil readily chars the key so that it loses its strength, or if a cross pin or the like is employed, the charring of the wood adjacent the same permits play, which is highly undesirable in articles of this character. This is aggravated where the utensil is of aluminum, because aluminum transmits heat very readily. It is old to run a bolt longitudinally through the handle and to draw said bolt up tight to force the end of the handle into a socket, but this merely makes it easier for the socket, when heated, to char the wood because of the close contact between them. The result is that no satisfactory scheme has heretofore been devised for attaching a wooden handle to the socket of a cooking utensil, particularly when made of aluminum.

One of the fundamental objects of the invention is to provide a handle which will remain cool. Another object is to provide a handle which will not become loose and turn relative to the pan or other utensil to which it is attached.

I accomplish the object of keeping the handle cool by constructing it of wood or other material having a low heat conductivity, and insulating this handle from the utensil by interposing a novel construction of block or socket of a thermally insulating composition. This insulating member is locked against rotation relative to the utensil, and the handle is locked against rotation relative to this insulating member, whereby the handle is effectually locked against rotation relative to the utensil without possibility of the handle being charred or heated from the heat of the utensil.

The insulating member is of such character that the heat from the socket will not char it and hence destroy its key, and the member serves as a heat insulator to prevent the heat from the socket charring the keying of the wooden handle. The result is that this insulating member performs a dual function.

Referring to the accompanying drawings illustrating a preferred embodiment:—

Figure 1 is an exploded perspective view of the socket on the utensil, the interposed insulating member, and the handle of my invention.

Figure 2 is a longitudinal sectional view showing the above three members in assembled relation.

Figures 3 and 4 are side and end elevational views of the insulating member.

Figure 5 is a longitudinal sectional view of the same; and,

Figures 6 and 7 are end elevational and longitudinal sectional views respectively of the nut which is mounted in the socket of the utensil.

The utensil, which may be a frying pan, griddle or the like, is designated 10, and has extending therefrom a tubular socket 11. I have employed this handle on a line of aluminum utensils, and with such construction I weld the flared end of the socket 11 to the body of the utensil 10. Prior to this welding operation, a nut 12 is inserted in the flared end of the socket 11, this nut being chamfered off at its rear end to correspond to the angle of the pan wall and having a downwardly flared end 12' which interlocks the nut in the socket. This nut will, of course, be rigidly imbedded in the fused metal which will flow in the welding operation. The nut is constructed of iron or steel in order to provide a durable thread 13 of sufficient strength for receiving the threaded end of the eye bolt 14. The hole in which threads 13 are formed is of relatively small diameter as compared to the diameter of the socket 11. Where the pan is constructed of a harder metal this nut and threaded hole may be constructed as an integral part of the socket or utensil.

The insulating member 15 is then inserted into the outer end of this metallic socket 11. This insulating member is formed of a heat insulating composition which has sufficient strength to rigidly key the handle 16 to the socket 11. It is not affected by a temperature which would char the wood and is more dense and hard than the wood of the handle. Such composition or material is illustrated by bakelite, fiber or the like. The inner end of this insulating member is reduced, as shown at 17, to telescope into the socket 11. This insulating member 15 is keyed against rotation in the socket 11 by a short spline or key 18 which projects down from the shoulder 19 and engages in a notch or keyway 21 cut in the under side of the socket 11. The inner end of the insulating member is preferably spaced from the end of the nut 12.

The outer end of the insulating member 15 is formed with two arcuate or semi cylindrical sockets 22 which receive correspondingly formed plug members 23 formed on the end of the handle 16. The bakelite between the socket 22 constitutes two keys 24 which engage in the slots 25 of the handle and rigidly lock the handle against rotation relative to the insulating member. It will be noted that the keying of the handle to the block 15 is larger or more extensive than the keying of the block 15 to the socket 11. This is possible because of the much greater strength and durability of the block 15 than the handle which may be made of relatively soft, cheap wood.

The eye bolt 14 is inserted into the outer end of the handle 16 and passing through the handle 16, insulating member 15 is threaded into the nut 12. It functions to securely tie the pan socket, insulating member and handle altogether. The eye 26 draws down against a steel ferrule 27, which is flared outwardly over the outer side of the wood handle, and inwardly down into a tapering recess in the end of the wood handle. The eye 26 serves as a convenient hook for hanging up the pan or utensil. The connection of the handle and insulating member to the pan by the eye bolt 14 provide for quick assembly and dis-assembly of the handle.

The member 15 is a cylindrical block of moulded insulating material which forms structurally an extension of the handle 14. It may be of any desired length. The relative position of keyway 21 and key 18 may be reversed.

It is to be noted that the endwise engagement of the wooden handle on the block 15 covers a greater area than the endwise engagement of the socket 11 with the block 15. This, like the keying engagement, permits of a relatively small bearing between the block 15 and the socket 11 and yet provides a relatively large bearing between the block 15 and the handle 14.

I claim:

1. In combination, a metallic socket having a threaded recess of reduced diameter, a rigid block of heat insulating material seating in said socket, said block and said socket having interengaging parts preventing rotation, said block having a socket, a handle seating in said latter socket, said block and said handle having interengaging parts preventing rotation, the interengagement of said handle and said block for preventing rotation being more extensive than the interengagement of said block and said socket, and a bolt threaded into said recess for holding the handle, the block and the socket rigidly together.

2. In combination, a metallic socket, a rigid block of heat insulating material fitting into said socket, said block and said socket being keyed together, said block having a socket, a handle fitting into said latter socket, said handle and the block being keyed together by a key and keyway of greater size than the key and keyway of the socket and block, and means for holding said socket, said block and said handle endwise in engagement.

3. In combination, a metallic socket having a rigid cylindrical block of heat resisting material seated in said socket, said block and said socket having interengaging parts preventing relative rotation, a handle engaging said block, said block and said handle having interengaging parts preventing relative rotation, the interengagement of said handle and said block being more extensive than the interengagement of said block and said socket, and means for holding said handle, block and socket together.

4. In combination, a cylindrical socket, a cylindrical heat insulating block having a reduced portion fitting into said socket, said block and said socket being keyed together, a cylindrical recess in the outer end of said block, said recess having a key therein, a handle having a reduced cylindrical portion with a keyway fitting into the recess in the end of the block, and a bolt member passing through the handle, through the block and into the socket to hold said parts together in endwise engagement.

5. In combination, a cylindrical socket, a cylindrical heat insulating block having a reduced portion fitting into said socket, said block and said socket being keyed together, a cylindrical recess in the outer end of said block, said recess having a key therein, a handle having a reduced cylindrical portion with a keyway fitting into the recess in the end of the block, and a bolt member passing through the handle, through the block and into the socket to hold said parts together in endwise engagement, the outer surface of said block being substantially continuous with the outer surface of one of the contiguous parts.

6. In combination a metallic socket having a notch cut in the edge thereof, a cylindrical block member having a reduced portion fitting into the socket and having an extending key projecting into said notch, a cylindrical recess in the opposite end of said block having a transverse web, a wooden handle having a cylindrical boss in its end, said boss being slotted to fit over the web in said recess, and means for holding the socket, the block and wooden handle in engagement endwise.

7. As an article of manufacture, a rigid block of heat resisting and insulating material of a greater strength than wood, and able to withstand without injury higher temperatures than wood, said block having a socket at one end for receiving a wooden handle and having a stud at the other end for entering a metallic socket, both of said ends having means for locking the block against relative rotation with its coacting parts.

8. As an article of manufacture, a rigid self-supporting block of heat resisting and insulating material of a heat resisting character greater than wood, said block having means at one end for engaging a wooden handle and preventing relative rotation therewith and having means at the other end for engaging a metal socket, said latter means being provided with a non-circular portion for preventing relative rotation, and said block having an axial bore therethrough.

9. In combination, a cooking utensil having a metal boss at one side thereof, a wooden handle axially in line with the boss for holding said utensil, a solid block of heat resisting material engaging the boss and the handle, said boss, block and handle having interengaging shoulders to prevent relative rotation and an axial bolt holding said handle boss and block together.

10. In combination, a cooking utensil having a hollow socket on the side thereof, a straight wooden handle axially in line with the socket for holding the utensil, a block of non-metallic heat resisting material fitting into the socket and over the end of the handle and being non-rotatably engaged by each of said parts, and an axial bolt for holding said handle, block and socket together endwise.

11. In combination, a metallic socket forming a part of the utensil, a threaded nut fixedly secured in the socket, an integral self-supporting block of heat insulating and resisting material extending into the socket and being secured thereto against rotation, said block having a shoulder engaging the outer end of the socket, said block providing a socket for a wooden handle, said handle being non-rotatably secured to said latter socket and having a shoulder engaging the outer end of said latter socket, and a bolt extending longitudinally through the handle, the block, and into the nut to hold the parts together.

12. As an article of manufacture, a rigid integral block of heat insulating and resisting material having a reduced stud at one end bearing a shoulder for non-rotatably securing the block to a metallic socket and having an axial socket at the other end for receiving a handle, said socket having a shoulder for non-rotatably securing the same to a handle and an axial hole through the block.

13. As an article of manufacture, a rigid block of a heat resisting material having at one end a socket and an integral shoulder in said socket to cooperate with a part of the handle of a utensil which is subject to heat to prevent rotation.

14. As an article of manufacture, a rigid block of insulating material forming a heat insulating and resisting barrier between a utensil subject to heat and the handle thereof, said block having a stud portion at one end and a socket portion at the other, said stud and socket being axially spaced apart to be external of each other, said stud and socket having shoulders for independently non-rotatably securing them to cooperating parts, said block having a longitudinal hole therethrough.

15. In combination, a utensil subject to heat, a wooden handle piece therefor, a rigid block of heat insulating and resisting material having an axial socket for receiving therein the adjacent end of the wooden handle piece, said socket and handle piece having inter-engaging shoulders to prevent rotation and a longitudinal bolt through said pieces for holding them together.

16. In a utensil having a projecting boss member, the combination of a rigid block member of heat insulating material, one of said members comprising a socket, the other member having a cooperating projection seating in said socket, said socket and said projection having cooperating shoulders to prevent relative rotary motion of the members, a handle member in axial alinement with the block and the boss, said handle member and said block member having interengaging shoulders for preventing relative rotation between them by telescopic engagement of the handle member and said block member only, and means for holding said members endwise in engagement.

17. In a utensil having a projecting boss member, the combination of a self-supporting block member and a handle member, said members having telescopic parts for holding them all in alinement and having shoulders for limiting axial motion with respect to each other, and having longitudinally extending interengaging shoulders for preventing relative rotary motion between them by telescopic engagement of the handle member and said block member only, and means for holding said members in assembled position.

In witness whereof, I hereunto subscribe my name this fourth day of January, 1923.

HENRY C. GROVER.